April 7, 1936.  R. C. WARNEKE ET AL  2,036,784
FREEZING TRAY
Filed Oct. 26, 1933   2 Sheets-Sheet 1
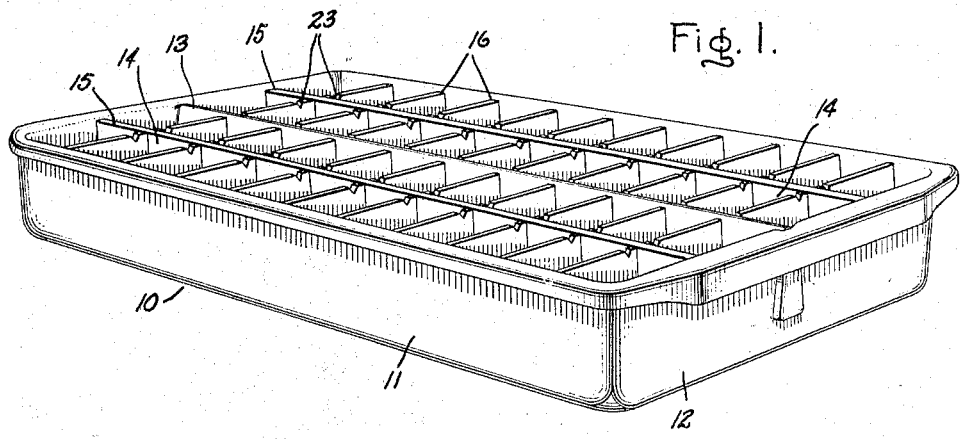
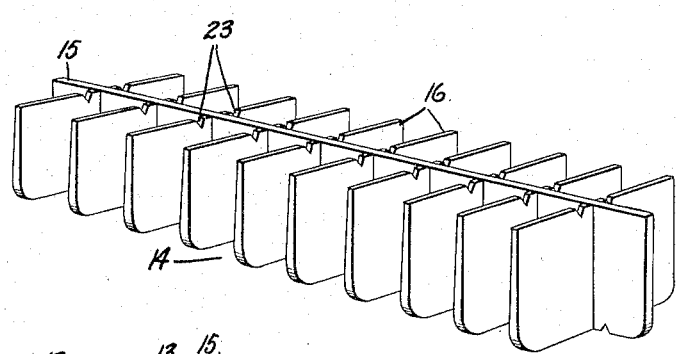
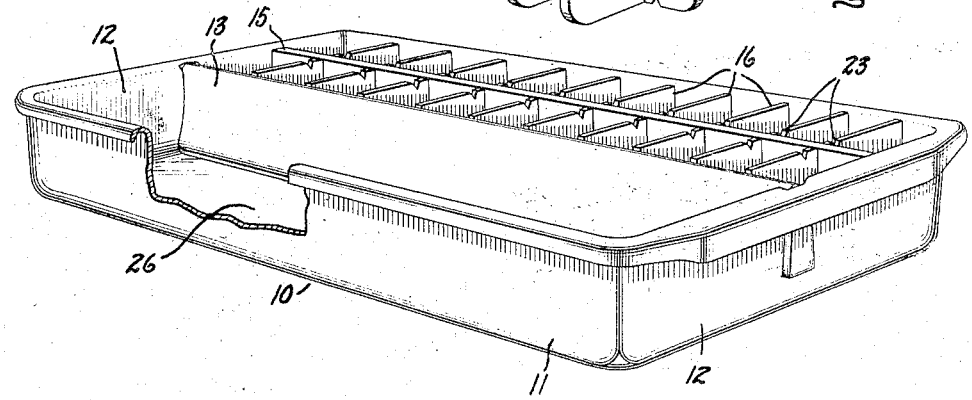
Inventors:
Roman C. Warneke,
Frank T. Grothouse,
by Harry E. Dunham
Their Attorney.

April 7, 1936.　　　R. C. WARNEKE ET AL　　　2,036,784
FREEZING TRAY
Filed Oct. 26, 1933　　　2 Sheets-Sheet 2
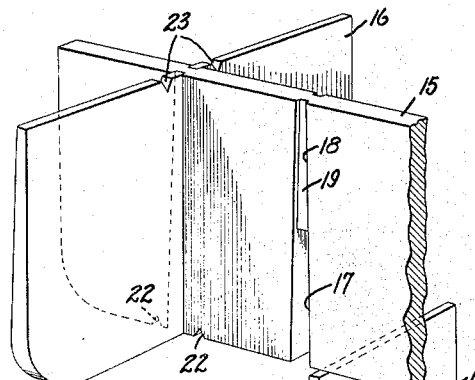
Fig. 3.
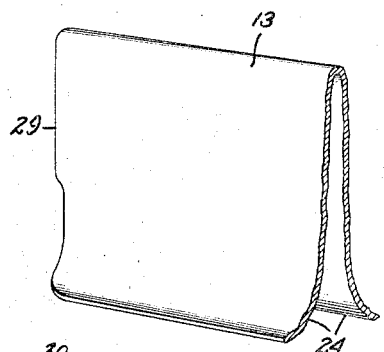
Fig. 4.
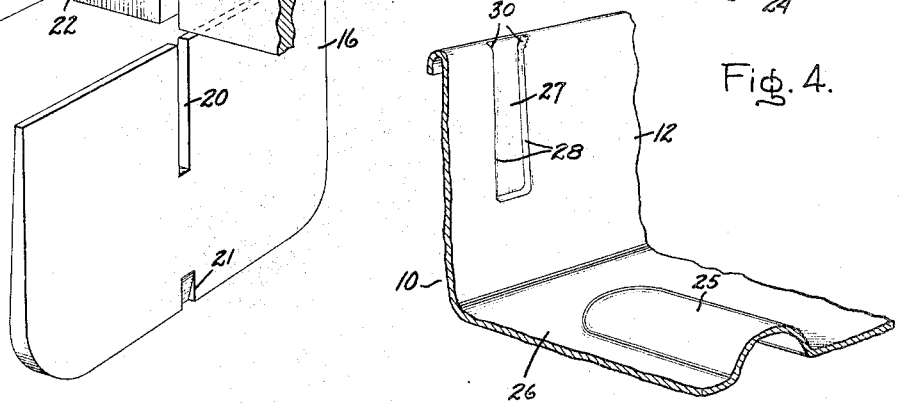
Fig. 5.
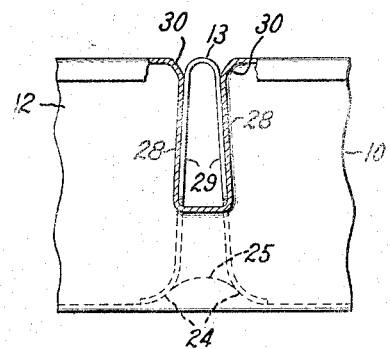
Inventors:
Roman C. Warneke,
Frank T. Grobhouse,
by Harry E. Dunham
Their Attorney Patented Apr. 7, 1936

2,036,784

UNITED STATES PATENT OFFICE 2,036,784

FREEZING TRAY

Roman C. Warneke and Frank T. Grothouse, Fort Wayne, Ind., assignor to General Electric Company, a corporation of New York Application October 26, 1933, Serial No. 695,256

6 Claims. (Cl. 62—108.5)

Our invention relates to freezing trays for use with the freezing units of refrigerators.

It has been the practice heretofore to construct large-capacity freezing trays with partitions or dividers in which some of the ice-cubes are entirely surrounded by the separator walls. When it is desired to remove the ice-cubes or the like frozen in the tray, the metal separators are heated as by pouring warm water thereover. This normally releases the cubes at the edges of the tray which are readily removed. If they are not released, slight pressure will remove them as the free ends of the dividers are flexible and give slightly under pressure. The cubes which are completely surrounded by the separators are more difficult to remove, especially since the separators are not sufficiently resilient to bend readily under pressure. If sufficient warm water is applied to melt the cubes in the center free from the separators, a large amount of the frozen material must be melted away with consequent loss.

It is an object of our invention to provide a large capacity ice-tray for the freezing unit of a refrigerator in which a plurality of separators are spaced apart by a partition and constructed so that none of the ice-cubes shall be surrounded on all sides by the separators.

Another object of our invention is to provide a freezing tray having a plurality of sections divided by partitions which will remain securely in place while frozen articles, such as ice-cubes formed by separators within the sections, are withdrawn from the tray, but which partitions may readily be removed for purposes of cleaning.

Further objects and advantages of our invention will become apparent as the following description proceeds, and the features of novelty which characterize our invention will be pointed out with particularity in the claims annexed to and forming a part of this specification.

For a better understanding of our invention, reference may be had to the accompanying drawings in which Fig. 1 is a perspective view of an ice-tray embodying our invention; Fig. 2 is a perspective view of the ice-tray shown in Fig. 1, partly in section, and having one of the ice-cube separators removed therefrom; Fig. 3 is a detail perspective view of the ice-cube separator construction; Fig. 4 is a detail perspective view of the construction of the partition; and Fig. 5 is an end view partly in section showing the manner of retaining the partition in place.

Referring now to the drawings, which illustrate one embodiment of our invention, in Fig. 1 we have shown a freezing tray 10 of a large capacity having side walls 11 and 12 and a partition 13 dividing the tray into two separate sections within which are arranged ice-cube separators 14. In Fig. 2 we have shown the freezing tray with one of the ice-cube separators 14 removed from its section of the pan 10. Each ice-cube separator 14 comprises a single longitudinal separator strip 15 and a plurality of transverse separator strips 16 cooperating therewith to form a plurality of open sided pockets on each side of the longitudinal separator strip 15 in which ice cubes or the like may be formed. The division of the tray into two separate sections makes it possible to provide a separator having a single longitudinal strip arranged substantially parallel to the partition so that when the separator is removed from the tray none of the ice-cubes are surrounded on all sides by separator walls. As shown in Fig. 3, the longitudinal strip 15 is provided with upwardly tapered slots 17, extending therethrough to about the center thereof and grooves 18 extending upward in alignment with the slots 17 on either side of the strip forming reduced portions 19. Each of the transverse strips 16 is of a tapered cross section corresponding to the taper of the slot 17 and is provided with slots 20 in the upper half thereof which fit snugly over the reduced portions 19 of the strip 15 and provide for rigid interlocking of the strips. Notches 21 at the lower edges of the strips 16 are provided so that the edges of the strip 15 adjacent the strip 16 may be swaged or crimped over to secure the longitudinal and transverse strips in place. This may be accomplished by spreading the metal with a wedge or other suitable tool forming notches 22 in the strip 15. The top edges of the strip 16 adjacent the longitudinal strip 15 are also forced against the strip 15 in a similar manner forming the notches 23.

In the illustrated embodiment of our invention we construct the partition 13 of a strip of resilient metal formed with a U-shaped cross section. The lower edges of the partition are flared outwardly as indicated at 24 to provide a rounded corner with which the lower edges of the ice-cube separator conform in the same manner as with the side walls of the tray. We provide an upwardly extending ridge 25 formed in the bottom wall 26 of the pan 10 over which the flared lower edges of the partition 13 are fitted and retained in place. The end walls 12 of the pan 10 are provided with recesses 27 formed therein, the sides of which have downwardly diverging shoulders 28 extending about midway of the wall. Each end of the partition 13 is provided with a projecting portion 29 which extends beyond the end a distance equal to the depth of the shoulders 28. When the partition 13 is inserted in the pan 10, the ends thereof are placed directly over the recesses 27 with the projections 29 resting against upwardly diverging portions 30 of the shoulders 28. These portions 30 are provided so that when the partition 13 is pushed downwardly they will compress the walls of the partition and allow the projections 29 to slip through the upper narrow portion of the recesses 27 and then expand as the partition is pushed down into place over the ridge 25. When the partition 13 is in position, the projections 29 engage the shoulders 28 throughout their length, as shown in Fig. 5, and maintain the partition firmly in place. The partition is thus detachably secured in the pan and can be removed by simply pulling it upward with sufficient force to force the projections 29 between the converging shoulders 28.

When in use the partition and separators are assembled in the freezing tray which is then filled with water or other fluid to be frozen and is placed in the freezing compartment of a refrigerator cooling unit where the fluid is frozen. The ice-cubes which are formed between the separators in each compartment may be removed by running warm water over the tray which will loosen the cubes from the pan. One or more of the separators filled with cubes may then be removed from the tray and the cubes may then readily be loosened from the separator. The partition will remain in place when the separators are removed, but may be removed when it is desired to use the tray without separators or to clean it.

It is apparent from the foregoing that we have provided a freezing tray for refrigerating machines which is of simple construction and which is provided with a partition securely held in place during the use of the tray, but which may readily be removed when desired and which makes possible the use of ice-cube separators surrounding the cubes on not more than three sides.

While we have described a particular embodiment of our invention, we do not desire our invention to be limited thereto, and we intend in the appended claims to cover all modifications within the spirit and scope of our invention.

What we claim as new and desire to obtain by Letters Patent of the United States, is:

1. A freezing tray including a pan, means including a partition detachably secured in said pan for dividing said pan into a plurality of sections, a removable ice-cube separator in each of said sections, each of said separators comprising a single longitudinal strip and a plurality of transverse strips, said transverse strips cooperating with said longitudinal strip to form a plurality of open sided pockets on each side of said longitudinal strip, and means independent of said ice cube separators and associated with said pan for resisting lateral pressure on said detachable partition.

2. A freezing tray including a pan, means including a longitudinal partition detachably secured in said pan for dividing said pan into a plurality of sections, a removable ice-cube separator in each of said sections, each of said separators comprising a single longitudinal strip arranged substantially parallel to said partition and a plurality of transverse strips, said transverse strips cooperating with said longitudinal strip to form a plurality of open sided pockets on each side of said longitudinal strip, and means independent of said ice cube separators and associated with said pan for resisting lateral pressure on said detachable partition.

3. A freezing tray having side and bottom walls, a detachable partition extending between two of the side walls of said tray, and means including pairs of downwardly diverging shoulders arranged in said side walls and detachably engaging the end portions of said partition for maintaining said partition in position in said tray.

4. A freezing tray having side and bottom walls, a partition extending between two of the side walls of said tray, a pair of downwardly diverging shoulders arranged on each of said two side walls, and means including resilient projections on the ends of said partition and engaging said shoulders for maintaining said partition in position in said tray.

5. A freezing tray having side and bottom walls, a partition extending between two of the side walls of said tray, the bottom edges of said partition being flared outwardly and engaging the bottom wall of said tray, a pair of downwardly diverging shoulders formed on each of said two end walls, and means including projecting portions on the ends of said partition and engaging said shoulders for removably retaining said partition within said tray.

6. A freezing tray having side and bottom walls, a resilient sheet metal partition having downwardly diverging sides and extending between two of the side walls of said tray, a pair of downwardly diverging shoulders formed on each of said two ends of said tray, means including a portion of the ends of said partition resiliently engaging said shoulders for removably retaining said partition in position in said tray, and means including a short upwardly diverging section of said pairs of shoulders for urging the lower edges of said partition together when said partition is moved downwardly into position within said tray.

ROMAN C. WARNEKE.
FRANK T. GROTHOUSE.